United States Patent [19]

Hollerith, Jr.

[11] Patent Number: 5,753,869
[45] Date of Patent: May 19, 1998

[54] CHILD'S WEIGHING PANEL ASSEMBLY

[76] Inventor: Richard Hollerith, Jr., Box 756, Mahwah, N.J. 07430

[21] Appl. No.: 774,676

[22] Filed: Dec. 26, 1996

[51] Int. Cl.⁶ .......................... G01G 3/00; G01G 21/28; G01G 19/00
[52] U.S. Cl. .......................... 177/225; 177/245; 177/231; 177/252; 177/233
[58] Field of Search ........................ 177/245, 225, 177/231, 232, 233, 148

[56] References Cited

U.S. PATENT DOCUMENTS

| | | | |
|---|---|---|---|
| 855,754 | 6/1907 | Buschmann | 177/225 |
| 1,587,904 | 6/1926 | Duncan | 177/233 |
| 2,193,212 | 3/1940 | Vincent | 177/233 |
| 5,360,950 | 11/1994 | Cheng | 177/232 |

Primary Examiner—Cassandra C. Spyrou
Assistant Examiner—Anh Mai
Attorney, Agent, or Firm—Bernard J. Murphy

[57] ABSTRACT

A panel having a suspending hook at a lower end thereof slidably receives an optimum-weight comparison chart. The hook is used to support a basket or sling in which a child is held for weighing. A spring-loaded limb overlies the panel, and has a stylus in an end thereof, with a second hook at the opposite end thereof. The second hook is used to suspend the panel from a tree branch, a beam, or such, and the weight of a child causes the panel to descend, against the biasing of the spring-loaded limb. The stylus is depressed to make a hole in the chart for comparison with an optimum trajectory of weight/development of children of like age, and to keep a record of the measured weight, and to track weight gain or loss with successive weighings and stylus hole-punching of the chart.

17 Claims, 3 Drawing Sheets

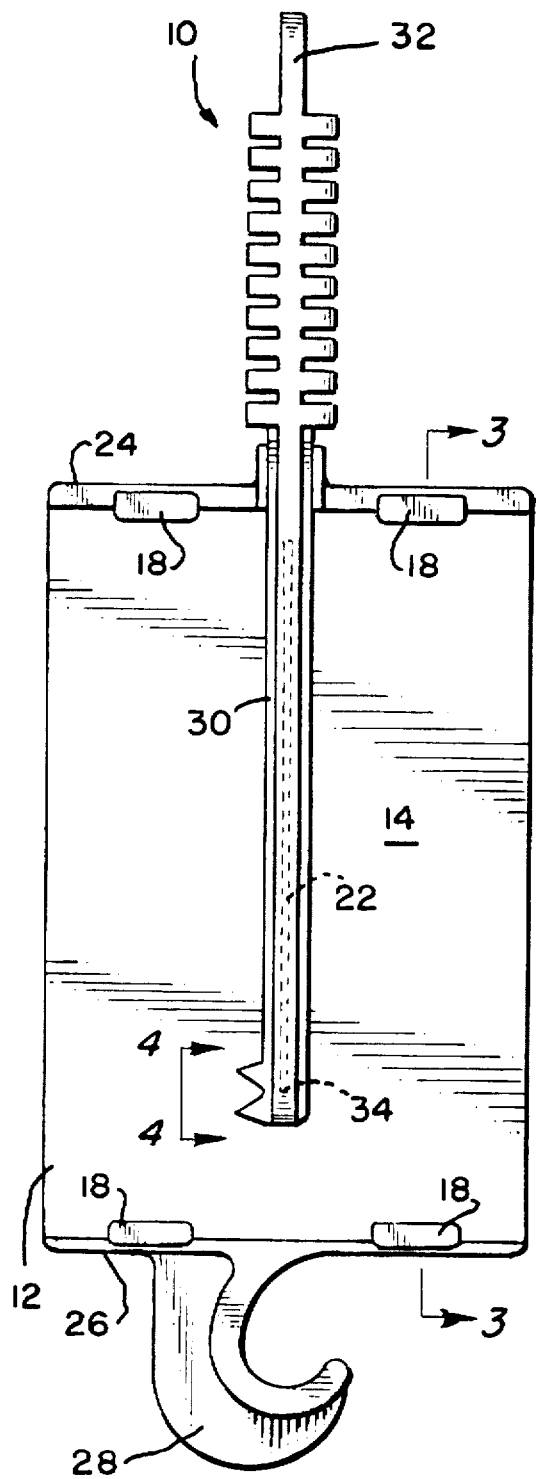
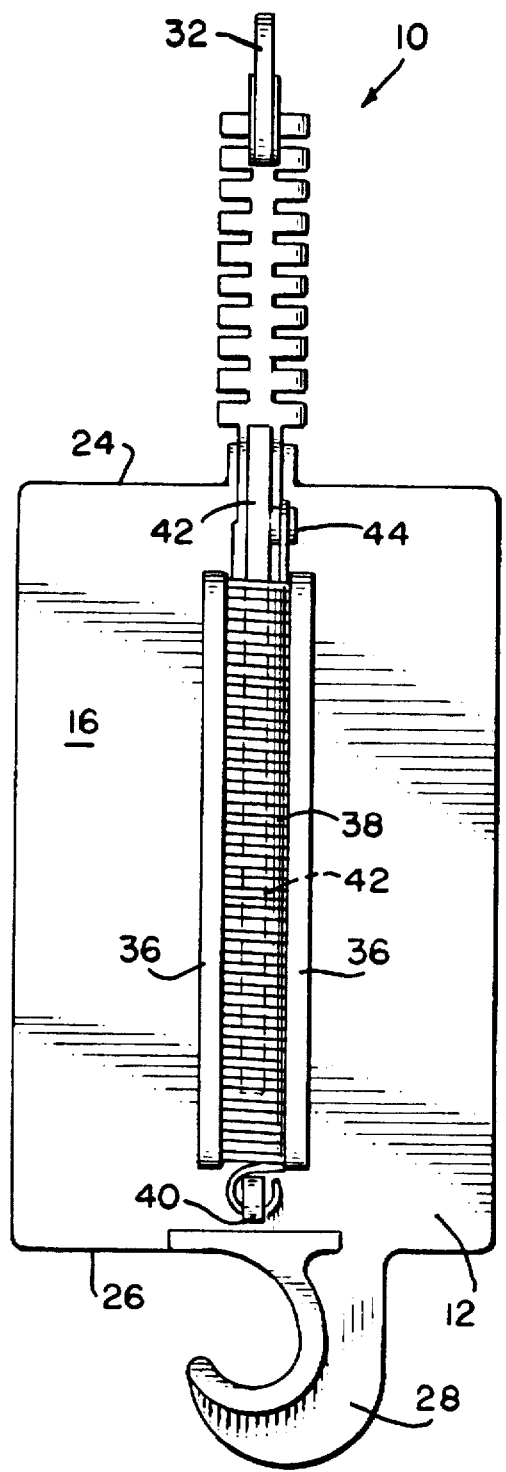

5,753,869

1

CHILD'S WEIGHING PANEL ASSEMBLY

This invention pertains to weighing scales, and the like, and in particular to a child's weighing panel assembly, for use in comparing a child's weight against a standard, or optimum weight range.

In underdeveloped countries, that is in the third world communities, where modern medical and health facilities are limited, and typically only available in major cities, the health of children in rural and remote areas is always at great risk. There has been a continuing need, in such environments, for a simple scale, of inexpensive reproduction, and facile use, for weighing children, especially young children, toward comparing the measured weight against a standard representative of healthy development.

It is an object of this invention to set forth a child's weighing panel assembly, for use in a child's weighing scale, to meet the aforesaid need. Particularly, it is an object of this invention to disclose a child's weighing panel assembly comprising a one-piece panel; a one-piece, bifurcated element astride said panel; and biasing means, coupled to said panel and to said element, for (a) holding said element astride said panel, and (b) accommodating a tensioned translation of said element relative to said panel; wherein said panel, said element, and said biasing means constitute all of said panel assembly; and wherein said panel and said element are molded, plastic components.

It is also an object of this invention to set forth a child's weighing panel assembly comprising a panel having obverse and reverse planar surfaces, and upper and lower ends; a first hanger integral with said lower end of said panel; a limb (a) having a second hanger integral therewith, (b) in a confronting disposition with one of said planar surfaces, and (c) slidable relative to said one surface; a tension spring coupled at one end thereof to the other of said planar surfaces, and coupled at the opposite end thereof to said limb, for (a) biasingly restraining said limb in a given relaxed disposition thereof, relative to said one surface, and (b) yieldably permitting a tensioned, slidable movement of said limb, relative to said one surface; wherein said one surface has a channel formed therein; and said limb has means, at an end thereof, for (a) entering said channel, and (b) sliding lengthwise of said channel, coincident with tensioned slidable movement of said limb.

Further objects of this invention, as well as the novel features thereof, will become apparent by reference to the following description, taken in conjunction with the accompanying figures, in which:

FIG. 1 is a plan view of the obverse planar side of the novel weighing panel assembly, according to an embodiment thereof;

FIG. 2 is a plan view of the reverse, planar side of the panel assembly of FIG. 1;

Figure 3:
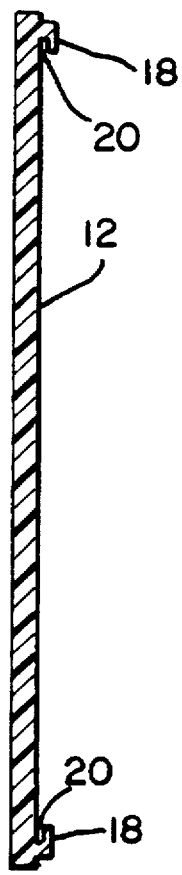
FIG. 3 is a cross-sectional view, taken along section 3—3 of FIG. 1.

As shown in the figures, the inventive weighing panel assembly 10 comprises a panel 12 having obverse and reverse planar surfaces 14 and 16, respectively. Adjacent upper and lower ends of the panel 12, and on the obverse-surface side thereof, are cantilevered ledges 18. The cross-sectional view of FIG. 3 shows the ledges 18 in a different aspect which illustrate the voids 20 under the ledges 18. Extending lengthwise of the panel 12, on the obverse-surface side thereof, is a channel 22; the channel 22 extends from an adjacency to the upper end 24 of the panel 12, toward an adjacency to the lower end 26 of the panel.

Integral with the lower end 26 of the panel is a hanger 28. As explained more fully in the ensuing text, hanger 28 is there for receiving thereon a sling, or basket, or the like, in which a child is secured, for the purpose of weighing such child.

Figure 4:
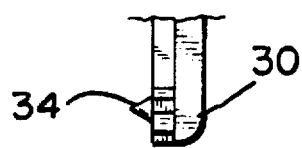
FIG. 4 is a view of the lowermost end of the elongate limb, taken along 4—4 of FIG. 1.
Figure 5:
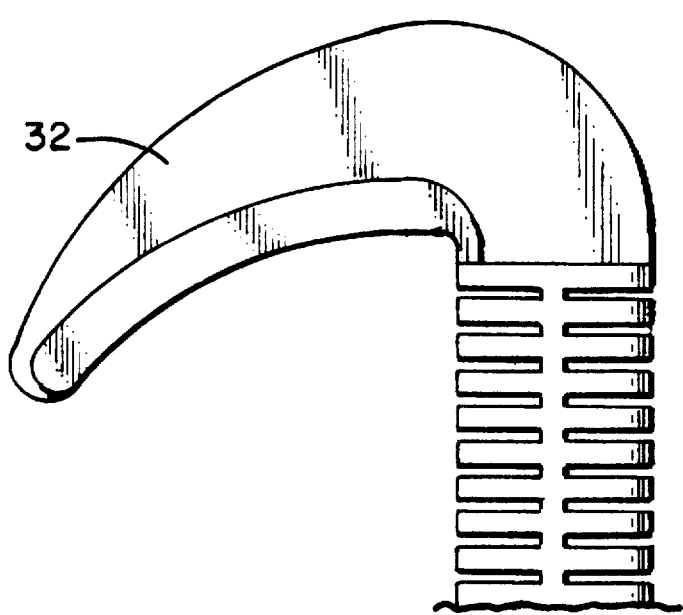
FIG. 5 is an enlarged, discontinuous view of the hanger integral with the elongate limb, the view taken from the left-hand side of FIG. 1.

As can be seen in FIG. 1, especially, an elongate limb 30 overlies the channel 22, and is slidable relative to surface 14. The uppermost end of the limb 30 has an integral hanger 32, the latter subsisting in a plane which is ninety degrees of arc from the plane of hanger 28. At the lowermost end of the limb 30, as can be seen in FIG. 4, is a sort of stylus 34. Stylus 34 slidably tracks the channel 22 and, upon the panel 12 moving relative to the limb 30, the stylus 34 moves lengthwise along the channel 22.

Integral with the reverse side of the panel 12 is a pair of parallel walls 36, the same extending perpendicularly from surface 16. The walls 36 nest therewithin a tension spring 38. Adjacent to the lower end 26 of the panel 12 is a lug 40, and one end of the spring 38 is enwrapped about the lug 40. Substantially obscured within the coils of the spring 38 is an arm 42 which, across the upper end 24 of the panel 12, is integrated with the limb 30. As a consequence, limb 30 and arm 42 define a bifurcated element. Arm 42 has a boss 44 formed thereon, and extending laterally therefrom. The opposite end of the spring 38 is enwrapped about the boss 44. With a tensioned withdrawal of the panel 12, relative to the hanger 32, the spring 38 extends, and arm 42, within the spring 38 and within the walls 36, serves as a linear guide for the slidable travel of the limb 30 along the channel 22.

Figure 6:
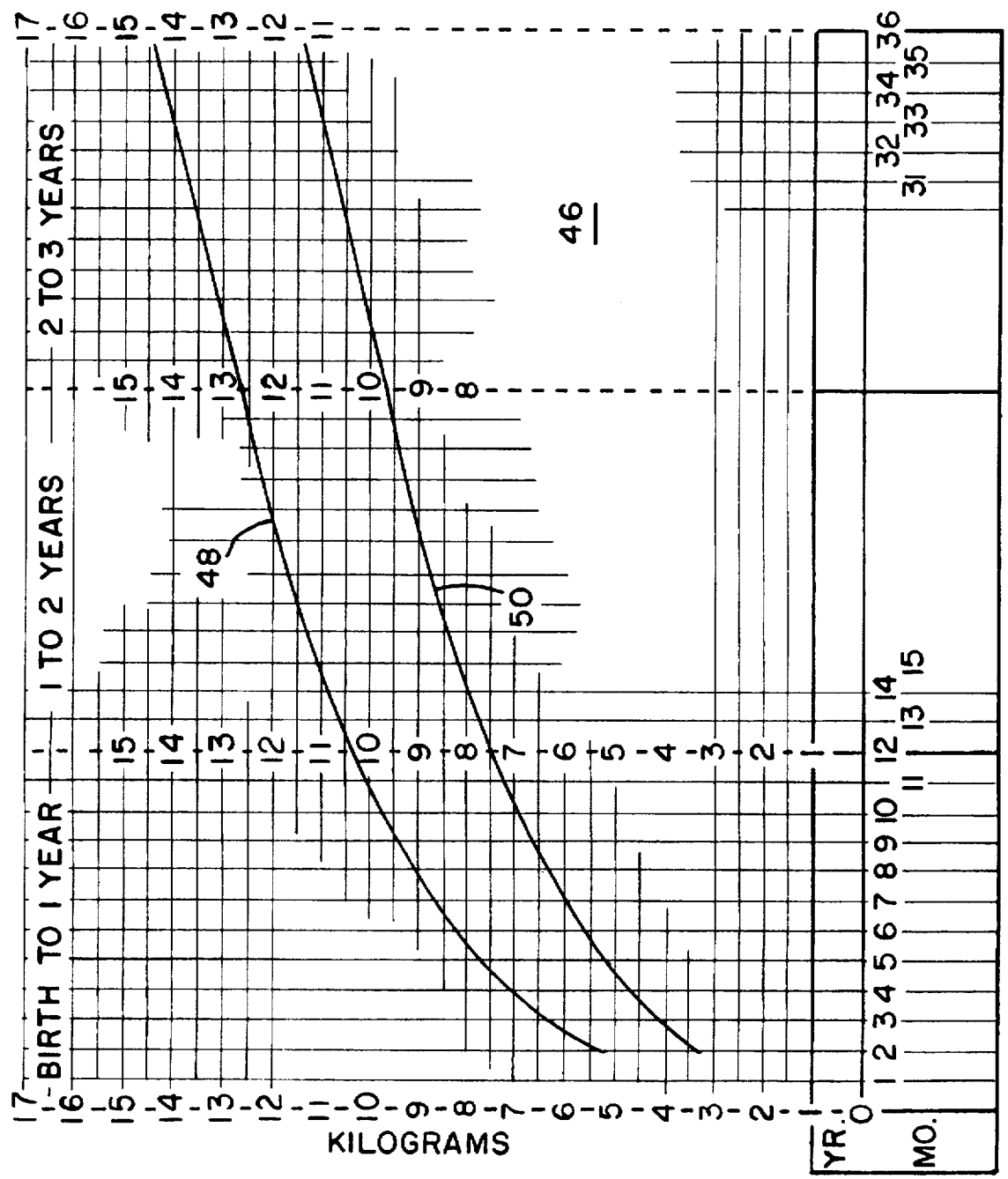
FIG. 6 is a plan view of the weight-comparison chart used with the novel weighing panel assembly.

Panel 12 serves as a receptor for a weight-comparison chart, such as chart 46 of FIG. 6. Chart 46 has a plurality of vertical displays or gridworks, namely: "Birth to 1 Year", "1 to 2 Years", and "2 to 3 Years", and thereacross are a pair of trajectory lines 48 and 50. The left-hand column enumerates a progression of kilograms. Across the bottom are spaces for entering the month of the birth of a child and the year of birth; the ensuing spaces, then are for marking either the months of the year, or the lunar phases. Between the lines 48 and 50 are the grid areas which signify good development for a child of the charted age (birth to one year, 1 to 2 years and 2 to 3 years, as noted before).

In use, one slidably fixes a chart 46 under the ledges 18, and under the limb 30. The panel assembly 10 is suspended from an overhang, that is, a beam, a tree branch, or whatever, via the hanger 32. Then the child is supported in a sling or basket, or such, from hanger 28. If the child is a newborn to one year of age, the chart 46 is slid until a vertical track of the gridwork is aligned with the current month of age of the child. Coincidentally, of course, the limb 30 will be vertically aligned with the child's current month of age. Then, by depressing the limb 30, the stylus 34 will enter the channel and, in so doing, will punch a hole in the chart 46. The thus hole-punched chart 46 is retained for that child's developmental study. A month hence, the child can be brought back for weighing again, and a second hole-punching of the same chart 46, to determine the healthy or unhealthy growth of the child. If successive hole-punches show a similar trajectory as lines 48 and 50, as signified as "good" in the upper right-hand of the chart 46, the child's growth is determined to be healthy. If the successive hole-punches are substantially horizontal, the child's growth is suspect or in danger. Too, if the hole-punches define a track which is downwardly directed, the child's growth and/or health is deemed very dangerously poor.

However rudimentary would be the health station; in some rural or desolate site, the panel assembly 10, used with the charts 46, adequately instructs one as to the development of children. The panel assembly 10 is of simple construction. Panel 12, and the bifurcated structure of limb 30 and arm 42, are each, one-piece, molded, plastic components. In total, then, the assembly 10 constitutes the three parts: the panel 12, the bifurcated structure 30 and 42, and the spring 38. The same can be mass-produced, and distributed widely in those underdeveloped areas of the world to monitor the healthy development of children, or to evidence cause for alarm if a child's weight is not progressing normally. Clearly, the panel assembly 10 is not a precisioned device, nor does it need to be, and for that reason at least, can be greatly reproduced with minimal cost. It is usable anywhere, literally anywhere, as it can be suspended from a tent rod, a tree branch, or any opportunistic overhang. The hole-punching offers a very simple weight record, per child, per chart 46, and the successive, vertical columns can be readily understood, by the parents or caretakers of the children, to represent months or cyclical lunar phases with the occurrence of which warrant bringing the child back for successive weighing.

While I have described the invention in connection with an embodiment thereof it is to be clearly understood that this is done only by way of example, and not as a limitation to the scope of the invention, as set forth in the objects thereof and in the appended claims. For example, the chart 46 of FIG. 6, does not show all of the of the gridwork but, in actual use, the chart would be fully lined, horizontally and vertically. FIG. 6 is simply representative. Too, the weight column is graduated in kilograms; this is arbitrary, of course, as the same could be supplanted with pounds; however the metric system is more widely used throughout the world. In lieu of hole-punching with the stylus 34, a weight record could be inscribed on the chart with pencil or ink; to that end the termination of the limb 30 has a V-shaped guide formed thereon for the purpose.

Pencil or ink inscriptions of weight progression, and/or a "pounds" chart for use with the panel 12, are alternative practices deemed to be within the ambit of my invention, and embraced by the appended claims.

I claim:

1. A child's weighing panel assembly, comprising:
   a panel having obverse and reverse planar surfaces, and upper and lower ends;
   a first hanger integral with said lower end of said panel;
   a limb (a) having a second hanger integral therewith, (b) in a confronting disposition with one of said planar surfaces, and (c) slidable relative to said one surface;
   a tension spring coupled at one end thereof to the other of said planar surfaces, and coupled at the opposite end thereof to said limb, for (a) biasingly restraining said limb in a given, relaxed disposition thereof, relative to said one surface, and (b) yieldably permitting a tensioned, slidable movement of said limb, relative to said one surface; wherein
   said one surface has a channel formed therein; and
   said limb has means, at an end thereof, for (a) entering said channel, and (b) sliding lengthwise of said channel, coincident with tensioned slidable movement of said limb.

2. A child's weighing panel assembly, according to claim 1, wherein:
   adjacent said upper and lower ends of said panel, said one surface has cantilevered ledges.

3. A child's weighing panel assembly, according to claim 1, wherein:
   said channel extends lengthwise of said one surface, from adjacency to said upper end of said panel, toward an adjacency to said lower end of said panel.

4. A child's weighing panel assembly, according to claim 1, wherein:
   said other planar surface has means formed thereon in which to nest said spring.

5. A child's weighing panel assembly, according to claim 4, wherein:
   said spring nesting means comprises a pair of parallel walls extending perpendicularly from said other planar surface.

6. A child's weighing panel assembly, according to claim 1, further including:
   an arm integral with said limb, and extending parallel to said limb, confined within said spring.

7. A child's weighing panel assembly, according to claim 5, wherein:
   said other planar surface has a lug, extending therefrom, in adjacency to one end of said walls; and
   said one end of said spring is enwrapped about said lug.

8. A child's weighing panel assembly, according to claim 6, wherein:
   said arm has a boss integral therewith, and extending therefrom laterally; and
   said opposite end of said spring is enwrapped about said boss.

9. A child's weighing panel assembly, according to claim 1, wherein:
   said first hanger subsists in a given plane; and
   said second hanger subsists in a plane which is ninety degrees of arc from said given plane.

10. A child's weighing panel assembly, according to claim 1, wherein:
    said panel occupies a given plane;
    said first hanger subsists in said given plane; and
    said second hanger subsists in a plane which is ninety degrees of arc from said given plane.

11. A child's weighing panel assembly, according to claim 1, wherein:
    said one planar surface has means integral therewith for slidably supporting a sheet thereon.

12. A child's weighing panel assembly, according to claim 11, wherein:
    said sheet supporting means comprises ledges, adjacent said upper and lower ends of said panel, having voids thereunder.

13. A child's weighing panel assembly, comprising:
    a one-piece panel;
    a one-piece bifurcated element having limbs set astride said panel; and
    biasing means, coupled to said panel and to only one of said limbs of said element, for (a) holding said limbs astride said panel, and (b) accommodating a tensioned translation of said element relative to said panel; wherein
    said one limb Penetrates said biasing means.

14. A child's weighing panel assembly, according to claim 13, wherein:
    said panel, element and said biasing means constitute all of said panel assembly.

15. A child's weighing panel assembly, according to claim 13, wherein:

said panel and said element are plastic, molded components.

16. A child's weighing panel assembly, according to claim 13, wherein:

said panel has a channel formed therein; and said element has means, at an end thereof, for (a) entering said channel, and (b) sliding lengthwise of said channel.

17. A child's weighing panel assembly, according to claim 16, wherein:

said means at an end of said element comprises a stylus.

* * * * *